United States Patent [19]

Mitchell

[11] Patent Number: 4,655,631
[45] Date of Patent: Apr. 7, 1987

[54] QUICK CHANGE TOOL HOLDER
[75] Inventor: James L. Mitchell, Rogers, Ark.
[73] Assignee: Rogers Tool Works, Inc., Rogers, Ark.
[21] Appl. No.: 699,529
[22] Filed: Feb. 8, 1985
[51] Int. Cl.[4] .......................... B23B 5/22; B23B 5/34; F16D 1/00
[52] U.S. Cl. .................................... 403/349; 279/1 B; 409/232; 409/233; 82/36 B; 403/8
[58] Field of Search .......................... 403/348, 349, 8; 279/1 W, 1 B; 409/232, 233; 82/36 B, 36 R

[56] References Cited
U.S. PATENT DOCUMENTS

| | | | |
|---|---|---|---|
| 1,856,973 | 5/1932 | Smith | 279/1 B X |
| 2,617,166 | 11/1952 | Kaufmann | 403/349 X |
| 2,953,403 | 9/1960 | Garey | 403/8 |
| 3,168,322 | 2/1965 | Dziedzic | 279/1 W |
| 3,533,638 | 10/1970 | Sedgwick | 403/348 X |
| 3,599,996 | 8/1971 | Holt | 279/1 B |
| 3,788,658 | 6/1974 | Benjamin et al. | 279/1 B X |
| 3,790,296 | 2/1974 | Mottu et al. | 403/348 X |
| 3,858,910 | 1/1975 | Oetiker | 403/349 X |
| 4,124,317 | 11/1978 | Dauth | 403/8 |
| 4,361,286 | 11/1982 | Hofmann et al. | 403/348 X |
| 4,436,464 | 3/1984 | Seiberlich | 409/233 |
| 4,499,800 | 2/1985 | Stahl | 279/1 B X |

FOREIGN PATENT DOCUMENTS 2752697  6/1978  Fed. Rep. of Germany ...... 409/233

Primary Examiner—Cornelius J. Husar
Assistant Examiner—Todd G. Williams
Attorney, Agent, or Firm—Dickstein, Shapiro & Morin

[57] ABSTRACT

A quick change tool holder of the block tool type wherein a tool nose assembly is releasably secured to a drive member or holder. The tool nose includes a bayonet portion extending axially outward from the rear end thereof which is receivable by an axial opening in a locking assembly housed in the drive member. The bayonet portion is positioned behind a locking ring in the locking assembly, and this locking ring is selectively shiftable axially of the drive member between disengaged and engaged conditions against and under the influence of spring biasing means. In the disengaged condition, the bayonet portion is insertable into and removable from association with the locking assembly. In the engaged condition, the spring biasing means acts against the locking ring to, in turn, act against the bayonet portion for moving the tool nose axially toward the drive member to place teeth on these two components in cooperative engagement to thereby effect a secure interconnection therebetween.

6 Claims, 5 Drawing Figures

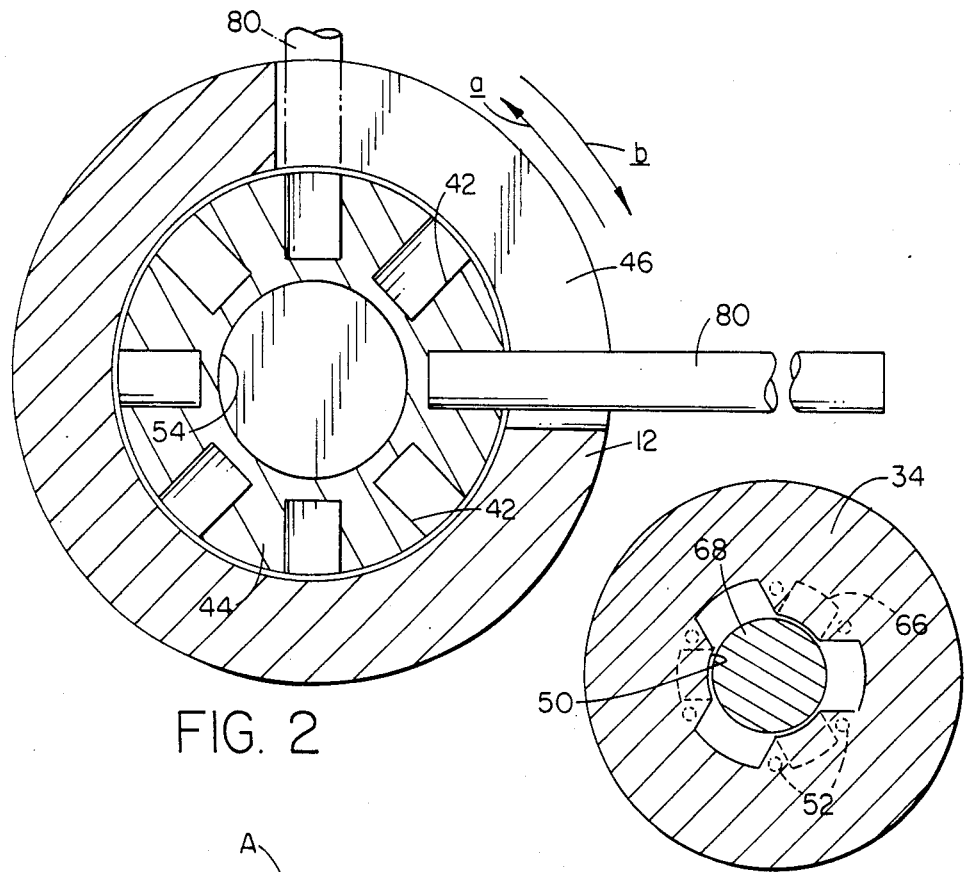
FIG. 2
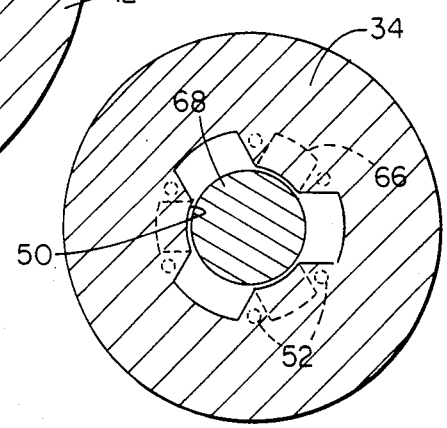
FIG. 3
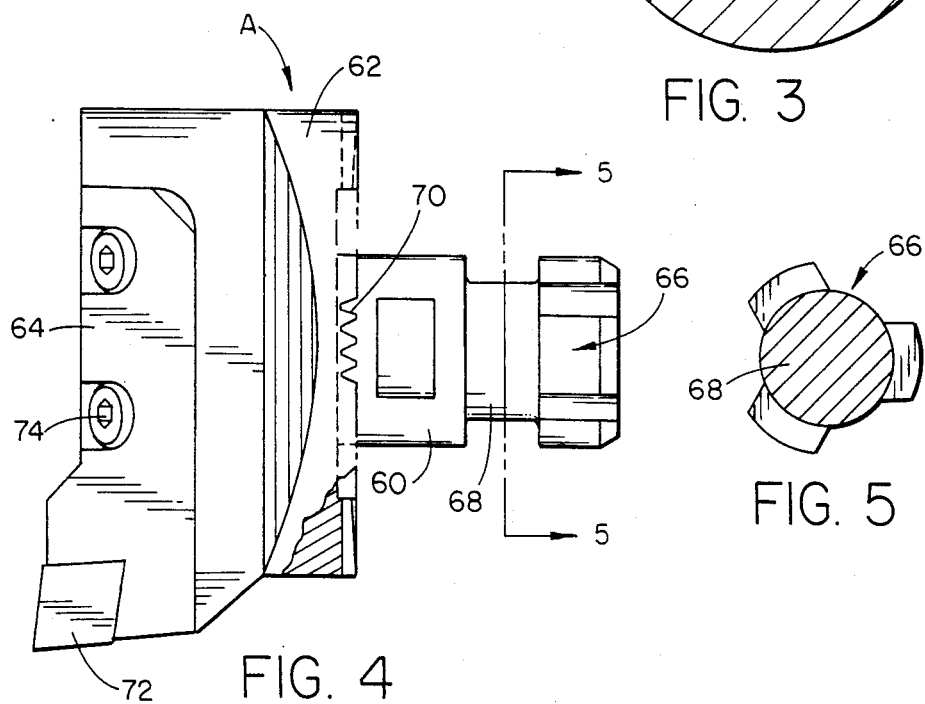
FIG. 4
FIG. 5

QUICK CHANGE TOOL HOLDER

BACKGROUND OF THE INVENTION

This invention relates to the art of tool holders. The invention finds particular application in tool holder systems wherein a plurality of separate tool assemblies are interchangeably mountable in a tool holder for performing a variety of machining operations and will be described with particular reference thereto. Such systems are commonly referred to as block tools, although it will be appreciated that the invention has broader applications and may be used in other environments.

Over the years, lathe units, as well as other machining equipment, have developed to the point where they can be left to operate on their own without continuous supervision by an operator. Such arrangements have spawned automatic tool changing systems which provide better performance and space saving tools than was heretofore possible with chain type magazine units equipped with heavy bearers which were changed by robotic equipment. Recently, the so-called block tool concept has been developed wherein tool changeover affects only the tool nose, and not the complete tool accessory. In this type of arrangement, a tool holder is fixedly secured by conventional means in a machine tool such as a lathe or the like, and this tool holder is adapted to selectively receive and retain a wide variety of tool noses therein. Each tool nose, in turn, includes a particular cutting tool which accommodates the performance of a desired machining step.

Systems which employ the block tool concept are relatively new and have provided generally satisfactory operational results. However, early systems or devices of this type do have some shortcomings such as an excessive number of component parts, complex operations, tool nose retention difficulties, and the like. Therefore, it has been considered desirable to develop an improved quick change tool holder device which would accommodate practice of the block tool type concept in a more efficient and effective manner.

The subject invention is deemed to meet the foregoing needs and overcome certain disadvantages and problems encountered with prior block tool systems to provide new and improved apparatus which is more efficient, has fewer parts, and which is more reliable in use.

BRIEF DESCRIPTION OF THE INVENTION

The present invention broadly relates to a coupling arrangement to facilitate selective interconnection of two members in an axially disposed relationship at an interface plane. In the preferred environment, this coupling arrangement is utilized in a tool holder for allowing a tool nose to be releasably secured to a drive member and wherein the drive member, in turn, is fixedly secured to a machine tool. The coupling relationship between the tool nose and drive member allows a plurality of separate tool noses to be easily secured to and removed from the drive member in a predetermined sequence to effect some desired machining results.

More particularly in accordance with the invention, the coupling is for connecting a pair of toothed members which drivingly engage each other at an interface plane. The coupling includes a locking subassembly and means for mounting this subassembly to one of the toothed members such that the locking subassembly is housed within and accessible from the forward end of the one member. Connecting means is provided for connecting the locking subassembly to the other toothed member with the locking subassembly extending substantially through the center of the interface plane. One of the mounting means and the connecting means includes biasing means for providing the primary force to effect driving engagement between the toothed members at the interface plane.

According to another aspect of the invention, one of the mounting means and the connecting means is selectively releasable for allowing the toothed members to be axially separated.

According to another aspect of the invention, the coupling arrangement includes means for selectively overcoming the force of the biasing means. In the preferred construction, the biasing means comprises spring washers which may be selectively compressed and expanded to effect released and locking conditions of the locking subassembly.

A primary advantage of the subject invention is the provision of a coupling arrangement for securely interconnecting a pair of cooperable members in an end-to-end relationship with each other.

Another advantage of the invention resides in providing a coupling arrangement for tool holders which increases the adaptability thereof.

Still another advantage of the invention is found in reducing the cost of interchangeable tool holders.

Yet a further advantage of the invention is an interchangeable tool having increased strength.

Other advantages for and benefits derived from the subject invention will become apparent to those skilled in the art from a reading and understanding of the following detailed specification.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein:

FIG. 2 is a cross-sectional view taken generally along lines 2—2 of FIG. 1;

FIG. 3 is a cross-sectional view taken generally along lines 3—3 of FIG. 1;

FIG. 4 is a side elevational view of the tool nose rotated approximately 90° from the position shown in FIG. 1; and, FIG. 5 is a cross-sectional view taken generally along lines 5—5 of FIG. 4.

DETAILED DESCRIPTION OF THE PREFERRED EMBODIMENT

Figure 1:
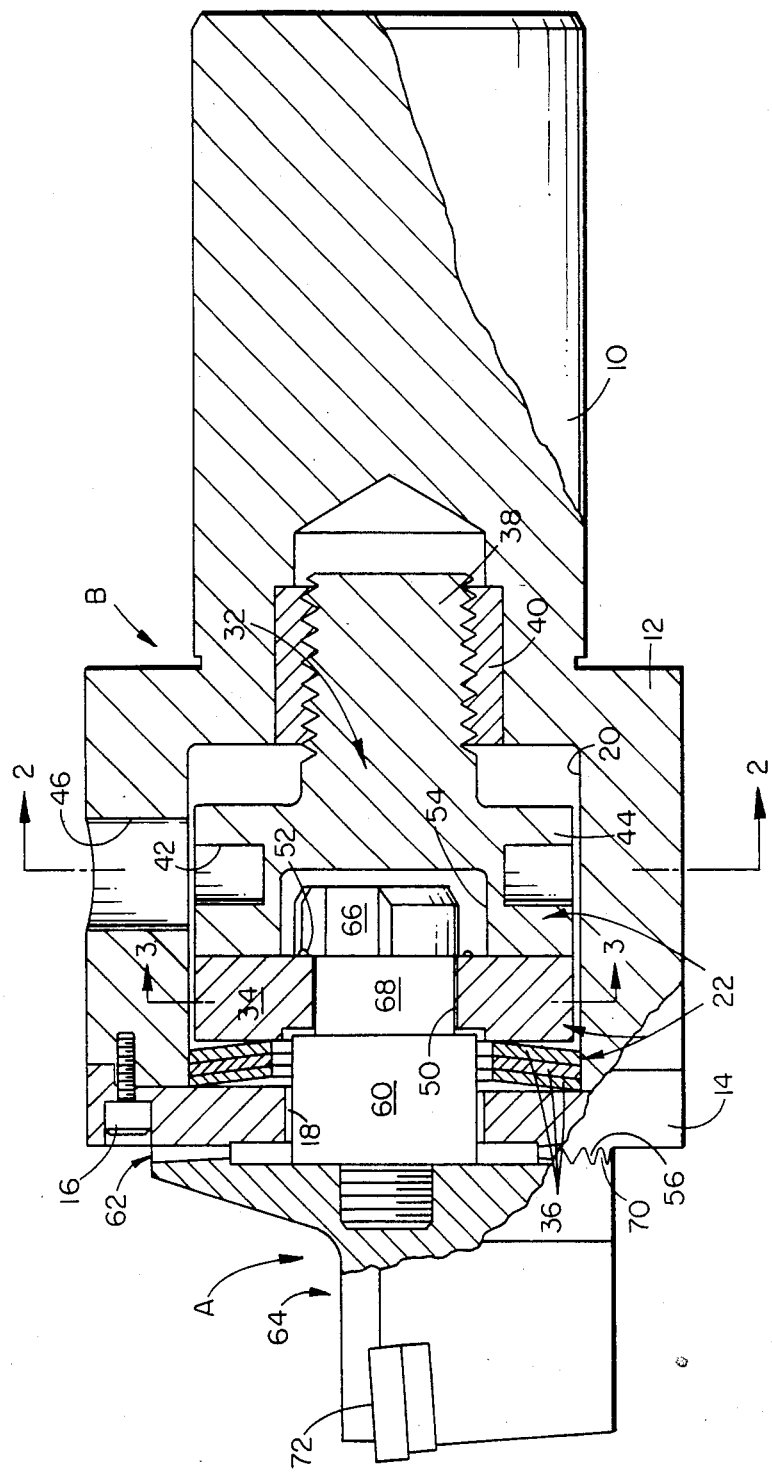
FIG. 1 is a side elevational view in partial cross-section showing a tool holder assembly incorporating the concept of the subject invention.

Referring now to the drawings, wherein the showings are for purposes of illustrating the preferred embodiment of the invention only and not for purposes of limiting same, FIG. 1 shows a spring loaded coupling arrangement for selectively connecting an interchangeable tool nose A with a universal drive member B.

More particularly, the universal drive member includes a generally cylindrical rear shank 10, an enlarged diameter generally cylindrical interconnect section 12, and a drive face 14 which is compatible with the interconnect section. Shank 10 is for chucking in a turning machine (not shown) by conventional means to connect universal drive member B to a driving force for the tool. The universal drive member can be readily adapted to use with any machine which accepts shank 10. Drive face 14 is fixedly connected to the forward end of interconnect section 12 by suitable threaded fasteners 16. The drive face has an axial opening 18 extending therethrough and communicating with an internal cavity 20 extending axially into interconnect section 12. A releasable coupling mechanism 22, in turn, is housed within cavity 20.

Coupling mechanism 22 includes a push ring member 32, a lock ring 34, and a series of Belleville spring washers 36. Push ring member 32 has a reduced diameter end 38 threaded for interconnection with a threaded nut 40 which is fixedly secured to cavity 20 adjacent the inner end thereof. As best shown in FIG. 2, push ring member 32 includes a series of equally spaced, radially extending holes 42 in a major diameter portion 44 thereof. A circumferential slot 46 in interconnect section 12 of universal drive member B facilitates access to radial holes 42 for reasons and purposes to be described. As shown, however, slot 46 extends over approximately 90° of the circumference of the interconnection section, and the width of the slot is significantly greater than the diameter of holes 42.

Major diameter portion 44 of the push ring member is disposed adjacent to lock ring 34. This lock ring is comprised of a solid piece of steel and includes a central bayonet slot opening 50 as shown in FIG. 3. As shown, opening 50 has three equidistantly spaced apart radial grooves, although a greater or lesser number, or a different conformation for these grooves, could also be satisfactorily employed. The planar inner surface or face of lock ring 34 which surrounds bayonet opening 50 is dimpled as by, for example, raised portions 52 (FIGS. 1 and 3). For reasons to be described, these raised portions are provided in pairs, with the raised portions comprising each pair being located adjacent opposite sides of an associated groove in opening 50. The raised portions are received within a cavity 54 provided in the forward face of push ring member 32 so as to not interfere with a face-to-face engaging relationship between the push ring member and lock ring 34.

Belleville spring washers 36 are interposed between the forward face of lock ring 34 and the drive face 14. The Belleville spring washers normally bias the lock ring away from the drive face with a force of approximately 2,000 pounds in the preferred embodiment.

While three such spring washers are shown in the drawings, it is to be appreciated that a greater or lesser number of these springs could be suitably employed. The outer surface or face of the drive face 14 includes a circular array of drive teeth 56 coaxial with opening 18 and adapted to be placed in driving engagement with compatible teeth on interchangeable tool nose A.

With particular reference to FIG. 4, interchangeable tool nose A generally includes a bayonet 60, a drive face 62, and a cutting tool 64. Bayonet 60 extends rearwardly from drive face 62, having a three pronged head 66 (FIG. 5) and a reduced diameter neck 68. The radial prongs on head 68 are dimensioned and configured so that they may be inserted through bayonet slot opening 50 in lock ring 34. Drive face 62 has teeth 70 arranged and configured to matingly confront drive teeth 56 of universal drive member B.

As shown, cutting tool 64 includes a hardened tip or cutting insert 72. The cutting tool is secured to tool nose A by conventional threaded fastening means 74. It is to be appreciated, however, that other tools and tool mountings may be advantageously employed without in any way departing from the overall intent or scope of the present invention.

In order to connect tool nose A to universal drive member B, and with principal reference to FIGS. 1 and 2, an operator inserts a rod-like tool 80 through circumferential slot 46 in the enlarged diameter interconnect section 12 to engage one of radially extending holes 42 in push ring 32 (FIG. 2). The operator then rotates the push ring by means of tool 80 in direction a for righthand threads the roughly 90° allowed by the end walls of the circumferential slot 46. Because of the threaded connection between the reduced diameter end 38 of push ring member 32 and nut 44 which is fixedly secured in cavity 20, such rotation causes the push ring to be moved axially of the cavity to bear against lock ring 34. This axial movement is, in turn, transferred through the lock ring to begin compression of Belleville spring washers 36. After each 90° of rotation, the operator removes tool 80 from the particular hole 42 then engaged, and engages it in a new hole 42 accessible at the initial end of the slot. Such further rotation of push ring member 32 with the corresponding axial movement increases the compression of Belleville spring washers 36.

After a number of successive rotations of the push ring, the Belleville spring washers will have been compressed sufficiently so that the operator can insert bayonet 60 of interchangeable tool nose A through opening 18 in drive face 14. When properly aligned, pronged head 66 of the bayonet is passed through bayonet slot opening 50 in lock ring 34 and is freely received in cavity 54, and the components are axially positioned so that teeth 70 of tool nose A will not mesh with teeth 56 on universal drive member B. The operator then rotates the tool nose approximately 60° in either direction to position the prongs of bayonet head 66 intermediate adjacent ones of dimples or raised portions 52 on the rear face of lock ring 34 to thus seat the bayonet.

While holding the tool nose A in the above-described located position, the operator again inserts tool 80 through circumferential slot 46 to engage one of the radially extending holes 42 in push ring 32 to rotate the push ring in direction b (FIG. 2). Such rotation has the effect of moving the push ring 18 axially inward into drive member B. This inward movement decompresses the Belleville spring washers so that lock ring 34 and joined tool nose A are similarly moved further into or toward drive member B.

After a number of rotations of the push ring, teeth 70 of tool nose 10 will engage teeth 56 of the universal drive member. With a few more rotations of the push ring, it will no longer bear on lock ring 34. Rather, the full force of Belleville spring washers 36 will act through the lock ring and bayonet 60 to cause engagement between the teeth 70, 56. At this point, push ring 32 need not be rotated any further. Once connected in the manner described, no external force is necessary in order to maintain fixed engagement of tool nose A to drive member B, and these components will function as a single unitary unit. To remove the tool nose from the universal drive member, it is merely necessary to reverse the interconnection process.

If desired, the compression-decompression of Belleville spring washers 36 could be accomplished with a motor within shank 10 or external to the drive member with equal effect to that of rod-like tool 80. Such modification does not, however, depart from the basic inventive concept here involved.

In an alternate embodiment, push ring member 32 and lock ring 34 would be connected together by pins for common rotation, and the pitch of the threads between push ring member 32 and nut 40 would be such that it would take only a very limited rotation of the push ring to sufficiently compress the Belleville spring washers to disengage the force urging mating engagement between teeth 70, 56. In this alternate embodiment, the operator would not have to rotate tool nose A relative to universal drive member B to engage-disengage the bayonet 60 to the lock ring 34. Rather, this engagement-disengagement would occur automatically with rotation of push ring 32 because of the connected relationship between the push ring member and lock ring.

As an extension of this alternate embodiment, push ring member 32 and lock ring 34 would be constructed as a single component, and raised portions 52 on the rear face of the lock ring would be replaced with a series of inclined ramps. Rotation of the unitary push ring-lock ring component would cause the prongs on head 66 of bayonet 60 to engage these inclined ramps. Due to the ramps, a 90° rotation of the unitary push ring-lock ring component would compress the Belleville spring washers and cause engagement of the bayonet at a locking stop. Further or reverse rotation of the unitary push ring-lock ring would decompress the Belleville spring washers and disengage the bayonet.

The preferred and alternate embodiments of the invention are simple, small, strong, and adaptable. That is, the embodiments contain a minimum number of components, all of which are functional. The embodiments are strong because the basic components are constructed from solid steel and a uniform 2,000 pound force is realized for connecting the tool nose to the drive member. The embodiments are adaptable because they are self-contained. The drive member and tool nose by themselves incorporate all of the parts necessary to make them interchangeable. The system can, therefore, be used with any machine that will accept shank 10 of the drive member with no special modifications being necessary to the machine. In addition, because the interconnection is mechanically spring loaded, a loss of power will not cause or occasion an inadvertent disconnection of the tool nose from the drive member.

While the invention has been disclosed with reference to its preferred form for use with a turning machine, the invention is readily adapted to use wherever an interchangeable tool nose is to be connected to a universal tool holder, whether rotating or non-rotating.

Various modifications of the invention disclosed will occur to others upon a reading and understanding of this specification. It is intended to include all such modifications insofar as they come within the scope of the appended claims or the equivalents thereof.

Having thus described the invention, it is now claimed:

1. A releasable coupling for first and second axially aligned toothed drive members which drivingly connect at an interface plane, said coupling comprising: the first of said drive members having an opening extending coaxially inwardly from a forward end thereof, a locking subassembly received in said opening and having opposed ends with one of said ends being axially spaced from said opening forward end, connecting means for fixedly connecting said locking subassembly to the second of said drive members in generally coaxial relation therewith, a locking ring mounted for axial movement in said opening and including means for releasably fixedly connecting said locking ring to the other end of said locking subassembly, spring means positioned between the forward end of said opening and said locking ring and biasing said locking ring inwardly of said opening to provide the primary force for physically connecting said first and second drive members at said interface plane, and manually operable means for selectively compressing said spring means such that the compression of said spring means disables the primary force physically connecting said drive members and allows release of said locking ring from said locking subassembly other end to permit axial separation of said drive members; said manually operable means including a push ring member threadedly mounted in said opening inwardly of said locking ring for selectively moving said locking ring toward said spring means by rotation of said push ring member.

2. The releasable coupling as defined in claim 1 wherein said spring means comprise spring washers located axially in said opening.

3. The releasable coupling as defined in claim 2 wherein said locking subassembly extends axially through said spring washers.

4. The releasable coupling as defined in claim 1 wherein said push ring member is selectively rotatable independently of said locking ring member.

5. The releasable coupling as defined in claim 4 including slot means through said first drive member for providing access to said push ring member.

6. The releasable coupling as defined in claim 5 wherein said push ring member has tool receiving openings aligned with said slot.

* * * * *